US010289360B2

(12) United States Patent
Hasegawa

(10) Patent No.: US 10,289,360 B2
(45) Date of Patent: May 14, 2019

(54) INFORMATION PROCESSING APPARATUS, CONTROL METHOD AND RECORDING MEDIUM

(71) Applicant: CANON KABUSHIKI KAISHA, Tokyo (JP)

(72) Inventor: Shin Hasegawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/103,304

(22) Filed: Aug. 14, 2018

(65) Prior Publication Data
US 2019/0056894 A1    Feb. 21, 2019

(30) Foreign Application Priority Data

Aug. 21, 2017  (JP) .................................. 2017-158783

(51) Int. Cl.
G06F 3/12    (2006.01)

(52) U.S. Cl.
CPC .......... *G06F 3/1231* (2013.01); *G06F 3/1209* (2013.01); *G06F 3/1232* (2013.01); *G06F 3/1292* (2013.01)

(58) Field of Classification Search
None
See application file for complete search history.

(56) References Cited

U.S. PATENT DOCUMENTS

2007/0173296 A1*  7/2007  Hara ........................ H04K 1/00
                                                              455/574
2011/0191631 A1*  8/2011  Suzuki .................... G06F 11/07
                                                              714/25

FOREIGN PATENT DOCUMENTS

JP    2007-060631 A    3/2007

* cited by examiner

*Primary Examiner* — Lennin R Rodriguezgonzalez
(74) *Attorney, Agent, or Firm* — Canon U.S.A., Inc. IP Division

(57) ABSTRACT

An information processing apparatus connected to an image forming apparatus over a wireless network broadcasts a packet to the wireless network to identify the current address of the image forming apparatus, unicasts a packet to a default address of the image forming apparatus to identify the current address of the image forming apparatus, or identifies the current address of the image forming apparatus based on an address of the information processing apparatus in the wireless network and information regarding a connection state of the network of the information processing apparatus so that the current address of the image forming apparatus can be identified to transmit print data to the identified address.

13 Claims, 9 Drawing Sheets

| Proto | Recv-Q | Send-Q | Local Address | Foreign Address | State |
|---|---|---|---|---|---|
| udp | xxxx | xxxx | 192.168.15.1:bootpc | 192.168.15.3:bootps | ESTABLISHED |

701

INFORMATION PROCESSING APPARATUS, CONTROL METHOD AND RECORDING MEDIUM

BACKGROUND

Field

The present disclosure relates to a technology for identifying an address on a wireless network.

Description of the Related Art

In the past, a technology for identifying an address of a printer has been proposed. Japanese Patent Laid-Open No. 2007-060631 discloses a technology for identifying an IP address by broadcasting from an information terminal apparatus to a printer.

In order to transmit print data from an information processing apparatus to an image forming apparatus, an address on a network of the image forming apparatus is to be identified. However, for example, an information processing apparatus having an operating system running thereon with some specifications and states cannot obtain a broadcasted response from the image forming apparatus, which may prevent identification of an address of the image forming apparatus.

Even when a broadcasted response cannot be obtained from an image forming apparatus, the present disclosure can identify an address of the image forming apparatus through another measure to transmit print data thereto.

In recent years, with emergence of high-performance mobile terminals, i.e., smartphones, a print plug-in has appeared enabling a printer vendor to add in a vendor-unique search processing function and a print processing function to a print application providing a print function on each of the mobile terminals and a printing system provided by an OS.

One example of a print application is Canon Print Business. A mobile terminal with Canon Print Business can search a printer on a local area network (LAN) via Wi-Fi®. An application has been known that executes a series of operations for printing in a mobile terminal, including decompressing a JPEG image or a PDF document file stored in the mobile terminal, converting it to a rendering format supported by the searched printer, adding print setting information, such as information regarding a paper feed tray and the number of copies to be printed, to the image or file to be configured as a print job, and transmitting the print job to the searched printer.

One example of a print plug-is Canon Print Service. Canon Print Service is an Android™ OS dedicated print plug-in and can be installed to add in a search function and a print processing function for printers manufactured by Canon to an Android OS printing system.

In a case where a printer and an application within an information processing apparatus perform wireless communication with Wi-Fi Direct® (WFD), the application sometimes cannot obtain an IP address of the printer from the information processing apparatus even though the application is in connection with the printer. A specific example in which such a phenomenon occurs will be described.

An application in a mobile terminal can support a plurality of communication methods and can be configured to communicate with a printer via a plurality of connection paths. In a case where a plurality of connection paths to the printer is available, it can be difficult for printer search processing within the application to obtain an IP address by broadcasting. For example, an information processing apparatus can use both of Wi-Fi® AP (access point) connection which communicates via an access point and a WFD connection. When broadcasting is performed on the WFD connection in a case where they are both used, it can take time to receive a response packet from the printer or a response packet may not even be received.

Even in the same environment, an IP address can easily be obtained via broadcasting. Therefore, it is unpredictable whether an IP address can be obtained without trying the broadcasting.

In view of the above, what is needed is identifying an IP address of a printer where a response packet cannot be received in an expected manner from a printer after broadcasting for printer searching.

SUMMARY

According to an aspect of the present disclosure, an information processing apparatus includes a connection unit configured to connect to an image forming apparatus over a wireless network, a first identifying unit configured to broadcast a packet to the wireless network and identify a current address of the image forming apparatus from a response packet to the packet, a second identifying unit configured to unicast a packet to a default address of the image forming apparatus on the wireless network and, if a response packet to the packet is received, to identify that the current address of the image forming apparatus is the default address, a third identifying unit configured to, if the first identifying unit and the second identifying unit do not identify the current address of the image forming apparatus, obtain an address of the information processing apparatus in the wireless network and information regarding a connection state of the network of the information processing apparatus and identify the current address of the image forming apparatus based on the address of the information processing apparatus and the information regarding the connection state of the network of the information processing apparatus, and a transmitting unit configured to transmit print data to the identified current address of the image forming apparatus.

Further features will become apparent from the following description of exemplary embodiments with reference to the attached drawings.

DESCRIPTION OF THE EMBODIMENTS

In view of the above, a method is disclosed herein that identifies an IP address of a printer in consideration of a case where a response packet cannot be received in an expected manner from a printer after broadcasting for printer searching.

Embodiment 1

An example of an embodiment of the present disclosure will be described in detail below with reference to the drawings.

Figure 1:
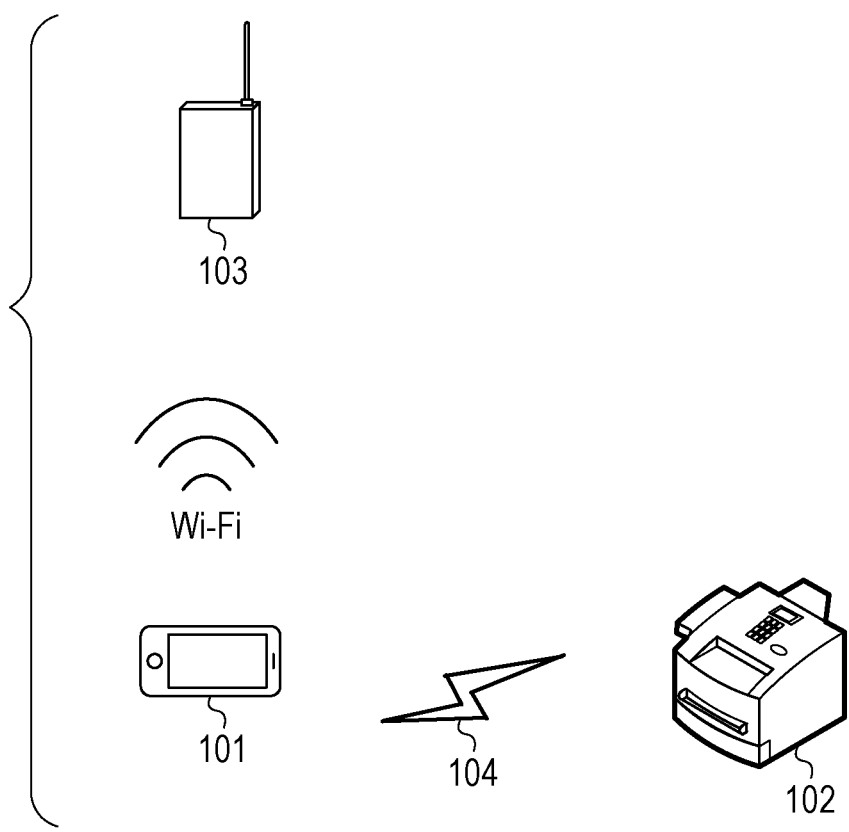
FIG. 1 illustrates a system configuration.

FIG. 1 illustrates a configuration of a data processing system according to an embodiment of the present disclosure. Referring to FIG. 1, a mobile information processing apparatus 101 is used by a user who instructs a print job transmission to a printer 102. The printer 102 is an example of an image forming apparatus and can include a print function, a copy function, a scanning function, a facsimile transmission function and so on. A wireless LAN access point 103 is an access point or a router for a wireless LAN having a general network router function and provides a wireless LAN via Wi-Fi® in a home or an office. The information processing apparatus 101 is a mobile terminal and includes a Wi-Fi® communication unit, which will be described below, so that a Wi-Fi® function thereof is enabled to connect to the wireless LAN access point 103. When the information processing apparatus 101 enters to a wireless LAN area provided by the wireless LAN access point 103, the information processing apparatus 101 can automatically participate in the network by using preset authentication information. A WFD wireless signal 104 is transmitted and received between the information processing apparatus and the printer, and a Peer-To-Peer wireless network can be formed between surrounding computer devices to which the wireless signal reaches.

Figure 2:
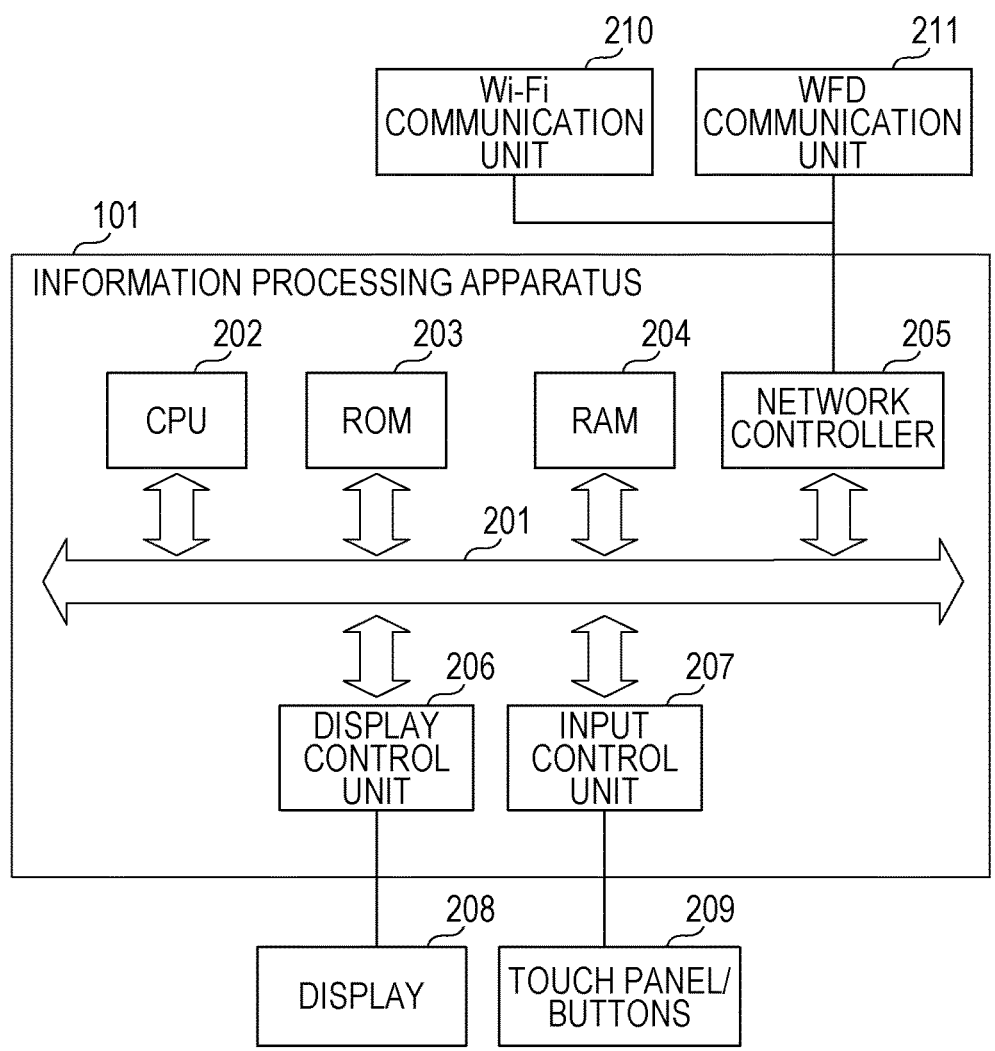
FIG. 2 illustrates a hardware configuration of an information processing apparatus.

FIG. 2 is a block diagram illustrating a hardware configuration of the information processing apparatus 101 in FIG. 1. The information processing apparatus 101 can be a mobile terminal or a smartphone on which an operating system for a small terminal and a program for controlling phone calls and data communication can run.

The following hardware components are connected to a system bus 201. A ROM 203 stores an operating system and applications for controlling phone calls and data communications in the information processing apparatus 101. The application for controlling data communications can be a print application, an e-mail software application, or a Web browser. A ROM 203 is a nonvolatile storage device and stores operation mode settings and operation logs that can be required to be stored even after the information processing apparatus 101 is rebooted.

A program stored in the ROM 203 is read to the RAM 204 and is sequentially executed by the CPU 202 to achieve the processing units illustrated in FIG. 3 and to implement the processing in the below-described flowcharts.

The RAM 204 is a memory used for execution of a program and is a work memory area in which an application executes a program. The RAM 204 is a memory for primarily storing data to be temporarily stored when an application executes a program.

A network controller 205 controls communication by a Wi-Fi® communication unit 210 and a WFD communication unit 211. The Wi-Fi® communication unit 210 is used for participating in a network via the wireless LAN access point 103. The WFD communication unit 211 is used for establishing a Peer-To-Peer network between surrounding computer devices to which a WFD wireless signal reaches. The display control unit 206 performs display control over a display 208 in the information processing apparatus 101. The input control unit 207 controls information designated by a user by using a touch panel/button 209 in the information processing apparatus 101. By using a display control unit 206 and an input control unit 207, an application running on the information processing apparatus 101 provides a user with network communication information and various kinds of information regarding the information processing apparatus 101. These controls are executed in an operating system running on the CPU 202.

Figure 3:
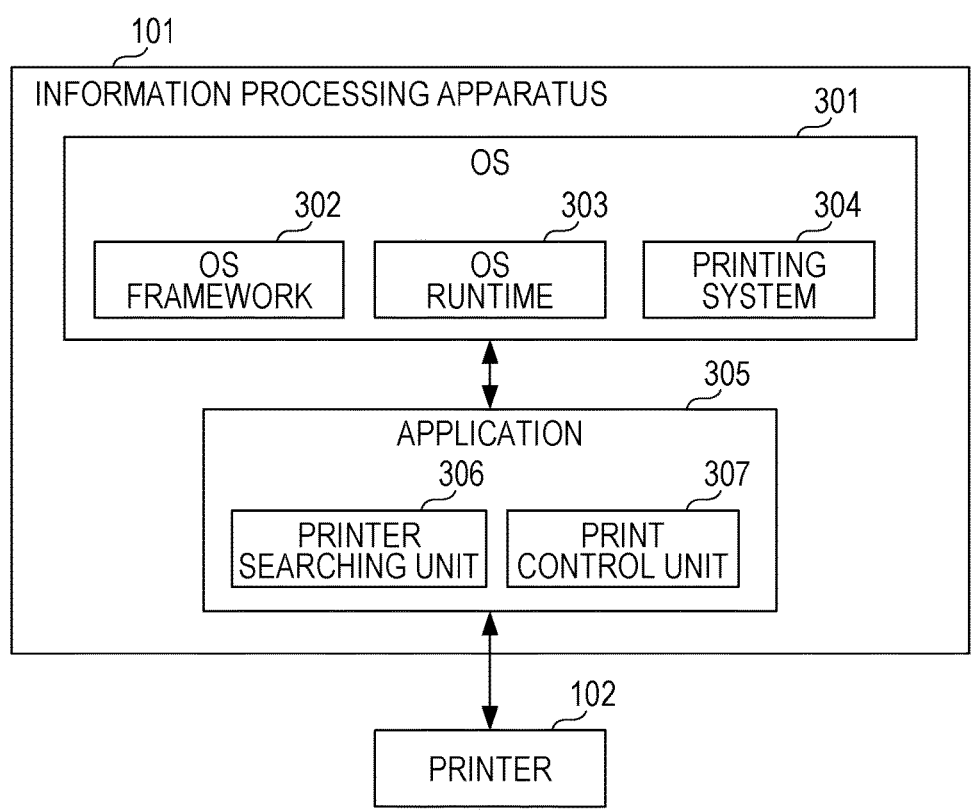
FIG. 3 illustrates a software configuration of the information processing apparatus.

FIG. 3 is a block diagram illustrating a software configuration of the information processing apparatus 101 illustrated in FIG. 1. An operating system (OS) 301 is pre-installed in the ROM 203 and controls basic software to provide various functions such as phone calls and network communications to applications within the information processing apparatus 101 through an OS framework. An OS framework 302 provides an open API for facilitating use of various functions by the OS for applications. Such an application can use the OS framework to establish a WFD connection with another apparatus, such as the printer 102, and to use functions such as the Internet connection and phone calls. A runtime library 303 is included in the OS. An application can use the OS runtime 303 to execute a basic program in the OS. For example, an application can execute a program configured to display statistic information regarding a network connection, a routing table, a network interface and so on and a program configured to check whether network communication is available with a designated host. A printing system 304 is installed as a function of the OS and is invoked from an application when the application requests to print by using the OS standard printing system.

Figure 4:
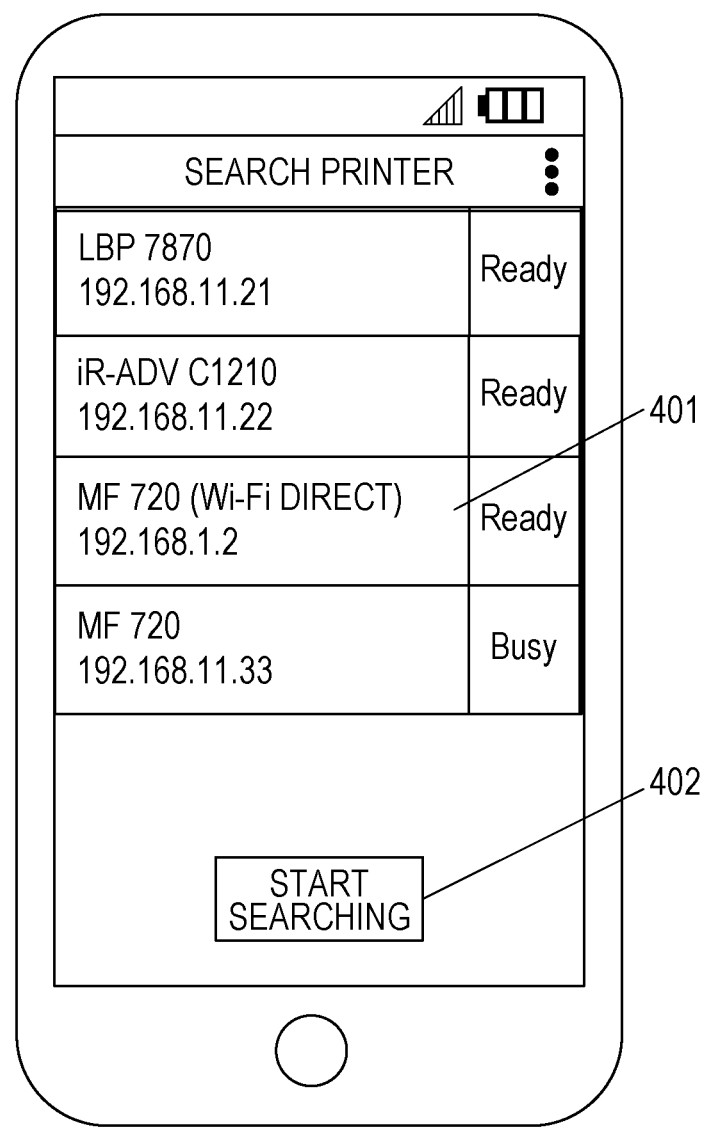
FIG. 4 illustrates a screen for searching and displaying a printer on an application in the information processing apparatus.
Figure 5:
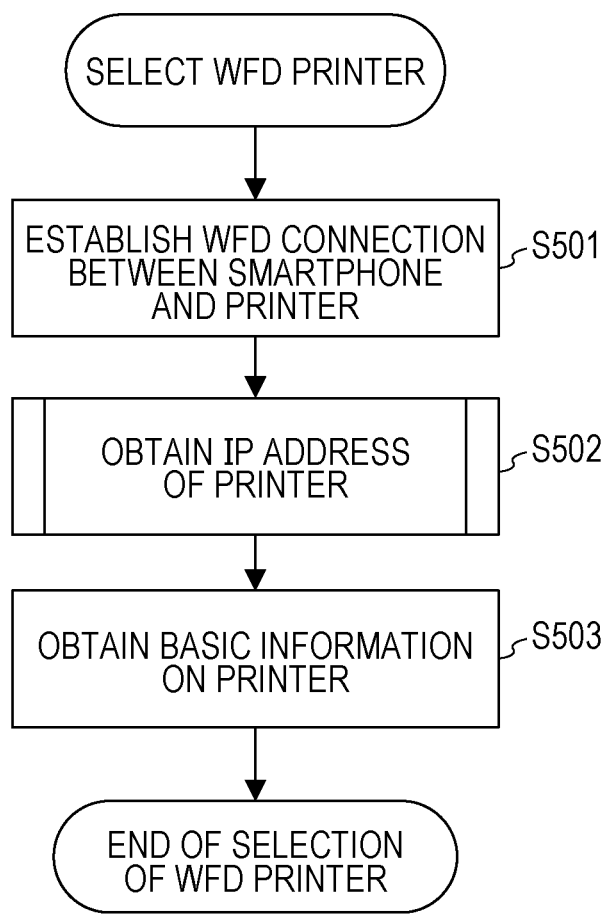
FIG. 5 is a flowchart illustrating processing upon selection of a WFD printer to be performed by the information processing apparatus.

An application 305 is installed in the ROM 203 to run on the OS. The application 305 includes a printer searching unit 306 and a print control unit 307 and provides a printer search function and a print function. The application 305 operates as an independent application that is accessible from a home screen and also operates as a print plug-in associated with the printing system 304. When the application 305 is accessed from the home screen and operates as a general application, a printer search screen as illustrated in FIG. 4, which will be described below, or a printer setting screen as illustrated in FIG. 5, which will be described below, can be displayed. Then, in response to a print instruction from a user, image data are transmitted to the printer. When the application 305 operates as a print plug-in, the printer search function and the print function are provided to the printing system 304 if the application 305 is invoked from the printing system 304 so that a user can print through a user interface of the printing system (not illustrated).

FIG. 4 illustrates an example of the user interface used when a user starts up the application 305 and searches a printer using the printer searching unit 306. The application 305 can search a printer through WFD in addition to a printer present on a LAN. A printer list in FIG. 4 displays a neighboring printer supporting WFD connection that is found by searching and corresponds to print processing by the application 305, in addition to a printer within the same LAN. A list item 401 indicating a printer supporting WFD connection is displayed with an indication of WFD connection. A search start button 402 can be pressed to search again for a printer present on the LAN and a printer supporting WFD connection by using the printer searching unit 306. The list item 401 can be selected so that processing based on a flowchart illustrated in FIG. 5, which will be described below, is performed.

FIG. 5 is a flowchart illustrating processing to be performed after a WFD printer as illustrated in FIG. 4 is selected.

The application 305 calls an API for WFD connection included in the OS framework 302 and establishes a WFD connection with the printer (S501). Search processing is performed for obtaining an IP address using the printer searching unit 306 for a printer with which a WFD connection is established (S502). The application performs processing for identifying an IP address of the printer because the IP address of the printer is not obtained even when a WFD connection with the printer is established. Main processing herein includes obtaining an IP address of the printer in the processing in S502, which will be described below with reference to the flowchart illustrated in FIG. 8.

The IP address obtained in S502 is used to perform processing for obtaining basic information from the printer (S503). The above-described processing, when the list item 401 indicating a WFD printer in FIG. 4 is selected, enables identifying an IP address by communicating with the printer so that information on the printer can be obtained.

Figures 6, 7:
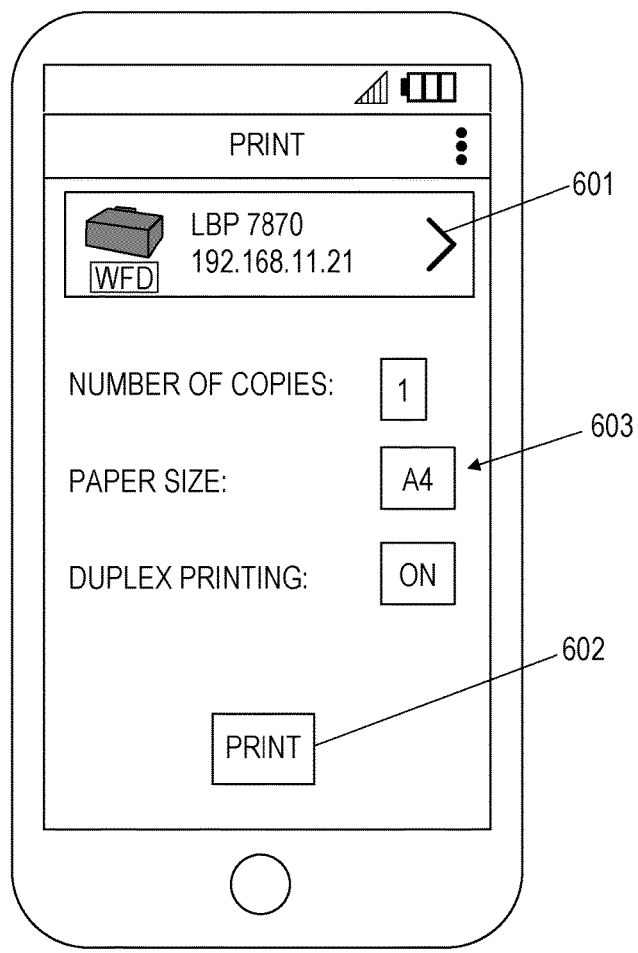
FIG. 6 illustrates a screen for defining print settings and printing on an application in the information processing apparatus.
FIG. 7 is a conceptual diagram illustrating a state list of network connections of the information processing apparatus.

FIG. 6 illustrates an example of the printer setting screen in the application 305. A printer selection button 601 can be selected to shift to the printer search screen illustrated in FIG. 4 where a printer on the same network can be searched and that a list of printers supporting a WFD connection can be displayed for connection. A print button 602 can be pressed by a user so that the print control unit 307 in the application 305 converts images data to a format printable by the printer 102 and the application 305 starts transmitting the image data to the printer 102. Basic print setting items 603 that can be defined can include a paper size, a number of copies, duplex printing and other print settings such as a print range, a paper type, and a designated page range.

Operations to be performed for identifying an IP address of a printer in S502 in FIG. 5 when a user selects the list item 401 indicating a WFD printer on the printer search screen illustrated in FIG. 4 will now be described.

Figure 8:
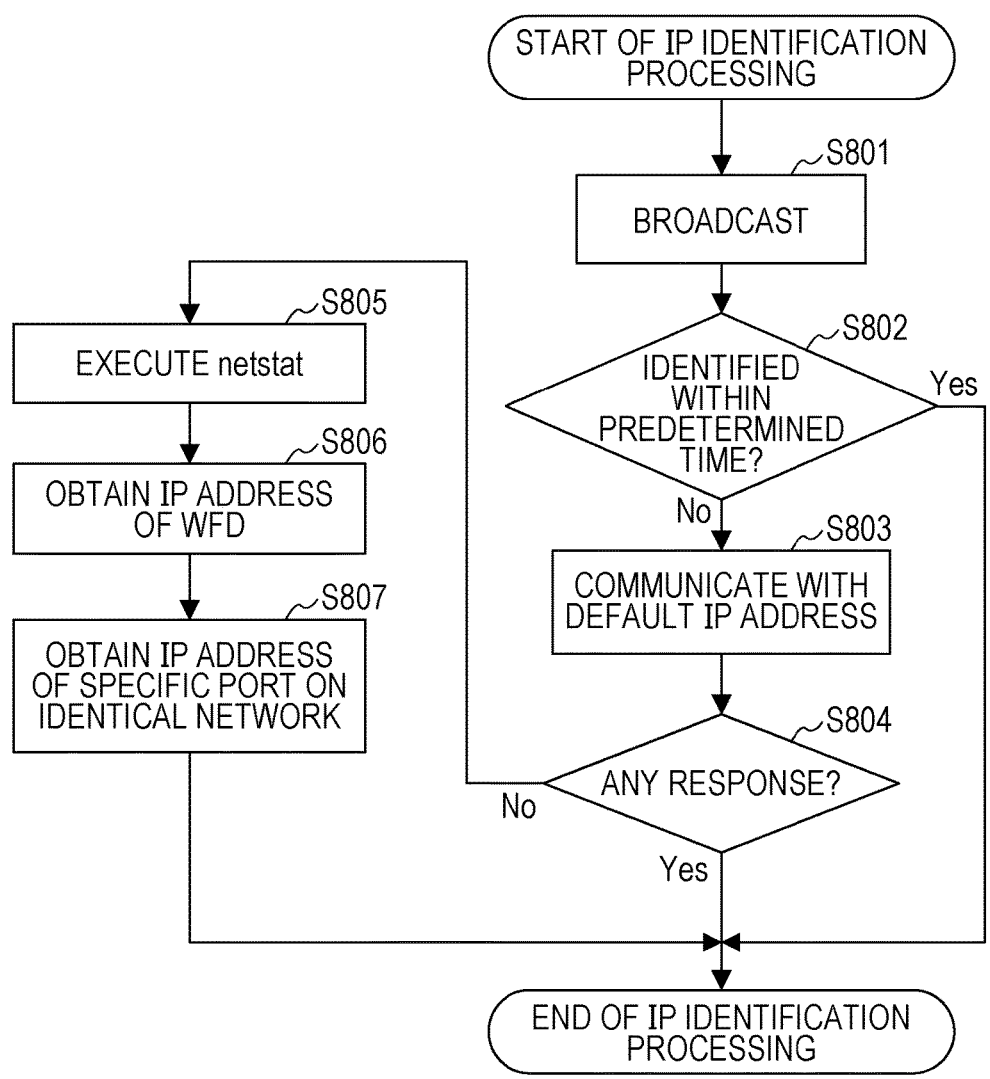
FIG. 8 is a flowchart illustrating processing for searching a printer according to Embodiment 1.

FIG. 8 is a flowchart illustrating processing for identifying an IP address of the printer 102 by the printer searching unit 306 in the application 305 when a WFD connection is established between the printer 102 and the information processing apparatus 101, which corresponds to the main processing according to the present embodiment.

The application 305 broadcasts an inquiry packet for searching a printer over a network including a WFD connection established between the printer 102 and the information processing apparatus 101 (S801). The inquiry packet includes a command inquiring an identifier (UUID or serial number) of a printer and a print capability (such as printable paper size, polychrome/monochrome, 2-in-1 layout supported/not supported). The inquiry packet can be based on a communication protocol such as Simple Network Management Protocol (SNMP).

If the application 305 receives a response to the broadcasted inquiry packet, an IP address of the printer can be identified from the header of the response packet. In this manner, a packet is broadcasted to a wireless network with the printer 102 to attempt to identify the current address of the printer 102 from a response packet to the packet.

Next, the application 305 receives a response to the inquiry packet broadcasted in S801 from the printer 102 within a predetermined period of time so that it can be determined whether the IP address of the printer has been identified (S802). Because a WFD connection has already been established between the printer 102 and the information processing apparatus 101, there are few cases where the printer has a deep sleep state in which the printer cannot immediately respond to the SNMP packet. Therefore, several seconds may be enough for waiting for a response to the broadcasted packet inquiry. In a case where an inquiry is returned within a predetermined period of time, the IP address of the printer 102 can be identified from the response packet. The IP address identifying processing then ends.

In S802, if no response is returned from a printer within a predetermined period of time, the application 305 attempts to communicate with a default IP address of the printer 102 (S803). Because the printer 102 may sometimes set a default IP address for establishing a WFD connection, the application 305 attempts communication with the default IP address of the printer. However, since the default IP address could be changed by a user or an IT administrator, the communication cannot always be attempted with the default IP address. The communication method can use a "Ping" program to check a network communication included in for OS runtime 303 or can use the SNMP protocol to transmit a packet to a default IP address and check a response thereto.

Next, a determination is made whether any response has been received from the printer 102 using the check method in S803 (S804). If a response has been received, it is determined that the default IP address is set for the printer. The IP address identifying processing then ends.

A packet can be unicasted to the default address of the printer 102 on a wireless network. If a response packet to the packet is received, it can be determined that the current address of the printer 102 is the default address.

If no response has been received in S804, a netstat program included in the OS runtime 303 is executed to check a network connection state of the information processing apparatus 101 (S805). The netstat program is a program for obtaining a network connection, a routing table, and statistic information regarding network interfaces. With the netstat, the information processing apparatus 101 can obtain a state of the currently connected network connection. FIG. 7 illustrates an example of the information obtained by netstat to check a communication protocol, such as an IP address and port information of the information processing apparatus, an IP address of a communication partner and port information.

Next, the application 305 obtains an IP address for a WFD connection between the application 305 and the printer 102 (S806). The WFD connection function and the network connection function are included in a framework in the OS 301. Thus, an API included in the OS framework 302 can be called to obtain an IP address of a network with which the application 305 has a WFD connection. For example, an IP address "192.168.15.1" can be obtained.

In a WFD connection, a printer always uses a bootps port. Next, an IP address of a specific port for the same network as the information processing apparatus 101 is extracted from the network information obtained in S805 (S807). A network part is identified based on the IP address of the WFD connection obtained in S806, and an IP address including the same network part as the identified network part and having a specific port designated is extracted from the network information obtained in S805. The network part will be described first, and then the specific port information will be described below.

The network part of the IP address for the WFD connection means an address excluding a host part of the IP address used by the information processing apparatus 101 for WFD connection. Because the printer 102 and the information processing apparatus 101 are within the same network in the WFD connection, their network parts of the IP addresses correspond. Therefore, the address of the network part can be calculated from the IP address for the WFD connection of the information processing apparatus 101 so that the network part of the IP address for the WFD connection of the printer 102 can be identified.

Next, specific port information will be described. In a case where a printer and a smartphone establish a Peer-To-Peer communication through WFD, a Group Owner (GO) uses a bootstrap protocol to perform permanent allocation to designate an IP address. Here, the GO is a device that sets an SSID, a password and an IP address of a network based on Wi-Fi Direct™ standard and that can function as an access point. Either the smartphone or printer can be the GO. While either device can be a GO in a communication under a bootstrap protocol, the printer operates as a server and the smartphone operates as a client based on a server-client relationship. Under a bootstrap protocol, a client side port uses bootpc (UDP No. 68 port) while a server side port uses a bootps (UDP No. 67 port). Therefore, the smartphone is determined to use a bootpc port in statistic information regarding network interfaces illustrated in FIG. 7, and the printer to use the bootps port illustrated in 701. In a case where a printer is in connection with a plurality of information processing apparatuses, the printer side ports are bootps.

In a case where a current address of the printer 102 is not identified in S802 and S803, an address of an information processing apparatus on a wireless network and information regarding a connection state of the network of the information processing apparatus can be obtained. Then, based on the address of the information processing apparatus and the information regarding the connection state of the network of the information processing apparatus, the current address of the printer 102 can be identified.

Instead of calculation of a network part of an IP address for WFD connection of the information processing apparatus 101, an IP address for the WFD connection of the printer 102 can be identified based on information regarding the port. According to a more specific procedure thereof, a line including the IP address for the WFD connection obtained in S806 is identified in the network information obtained in S805. Thus, for example, information on the second line in FIG. 7 can be obtained. Next, an IP address of the bootps port is obtained from the obtained information. According to this method, the IP address for the WFD connection of the printer 102 can be obtained without identifying the network part of the IP address of the information processing apparatus 101.

After the current IP address of the printer 102 is identified by one of the methods in S802, S803 and S805 to S807, the information processing apparatus 101 executes communication relating to the print processing with the identified IP address. More specifically, processing is performed including determining whether the printer 102 is of a product of user's company, obtaining a format of print data supported by the printer 102, obtaining other information regarding the printer 102, and transmitting the print data.

The identification of an IP address by processing in S802, S803 and S805 to S807 need not be performed in the order illustrated in FIG. 8. For example, identification of an IP address can be attempted in order of S803, S801, and S805 to S807.

As previously described, the identification in S801 cannot be performed when both Wi-Fi® AP and WFD connections are simultaneously established. Therefore, whether the simultaneous connections are established can be determined to change the processing to be performed based on the determination result. More specifically, whether the simultaneous connections are established may be determined before S801. Then, if the simultaneous connections are established, the processing in S801 is skipped, and the processing moves to S803. If not, the processing moves to S801.

For searching a printer to be performed by the information processing apparatus when a WFD connection is established between the information processing apparatus and the printer in the processing according to the present embodiment, a broadcast packet is transmitted to the printer and an IP address of the printer is identified from the response thereto. If no response to the broadcast packet is received from the printer, a communication check is performed on the default IP address of the WFD connection to identify the IP address of the printer. If no response to the communication check is received from the printer, a status of the network is obtained, an IP address of the printer is identified from the network part of the IP address for WFD connection of information processing terminal and information regarding a port number to be used for a WFD connection. Through this processing, communication with a printer and printing can be performed in a WFD environment.

Embodiment 2

The application 305 according to the previous embodiment identifies an IP address of a printer by using three schemes including response check by broadcasting, communication check to a default IP address, and checking of an IP address from a network connection state. However, an IP address can also be efficiently obtained using an OS framework according to the present embodiment.

Figure 9:
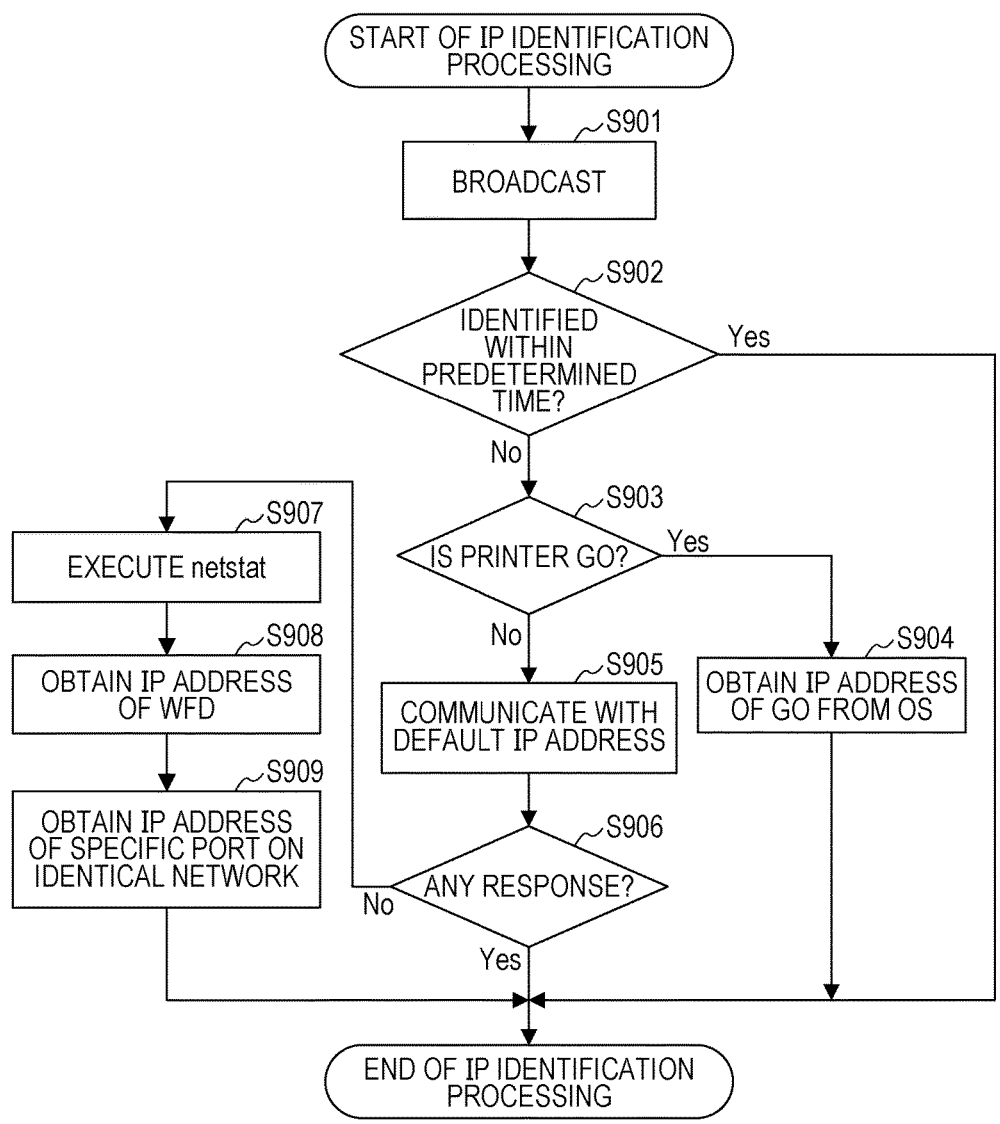
FIG. 9 is a flowchart illustrating processing for searching a printer according to Embodiment 2.

FIG. 9 illustrates a flowchart of IP address identifying processing for a WFD connection according to the present embodiment. Because the processing in S901 and S902 is the same as the processing in S801 and S802 according to the previous embodiment, any repetitive descriptions will be omitted.

If an IP address is not identified within a predetermined time period in S902, the application 305 uses an API relating to WFD in the OS framework 302 to determine whether the printer is GO (S903). Both the information processing apparatus and the printer can be GOs, and the application 305 can obtain IP addresses of the GOs by using the OS framework 302. Information indicating that the apparatus on which the application runs is a GO can be obtained by using the OS framework 302.

If the printer 102 is set as a GO, an IP address of the GO OS is obtained from the framework 302 (S904). Because the IP address of the printer 102 can be identified, the IP address identifying processing ends.

If the printer is not a GO in S903, the processing moves to S905. Because the processing in S905 to S909 is the same as the processing in S803 to S807 described above, any repetitive descriptions will be omitted.

For searching a printer to be performed by the information processing apparatus when a WFD connection is established between the information processing apparatus and the printer in the processing, a broadcast packet is transmitted to the printer, and an IP address of the printer is identified from the response thereto. If no response to the broadcast packet is received from the printer, it is determined whether the printer is a GO, and, if the printer is a GO, an IP address of the GO is obtained from the OS framework. If the printer is not a GO, a communication check is performed on the default IP address for a WFD connection so that an IP address of the printer can be identified. If no response to the communication check is received from the printer, the status of the network is obtained, and an IP address of the printer is identified based on the information regarding network part of the IP address for a WFD connection of the information processing terminal and the port number to be used for the WFD connection. Through this processing, communication with the printer and printing can be performed in a WFD environment.

Embodiment 3

The application 305 according as described above identifies an IP address based on a network connection state. However, programs in the OS runtime 303 for obtaining a network connection state and for performing communication check over the network cannot sometimes be executed due to differences in user environment and differences in specifications between terminals. For example, in a case where a smartphone vendor inhibits execution of such programs or in a case where an IT administrator limits the authority of the terminal, an authority error occurs, and the IP address of the printer cannot be obtained. The present embodiment provides a method for obtaining an IP address in such a case.

Figure 10:
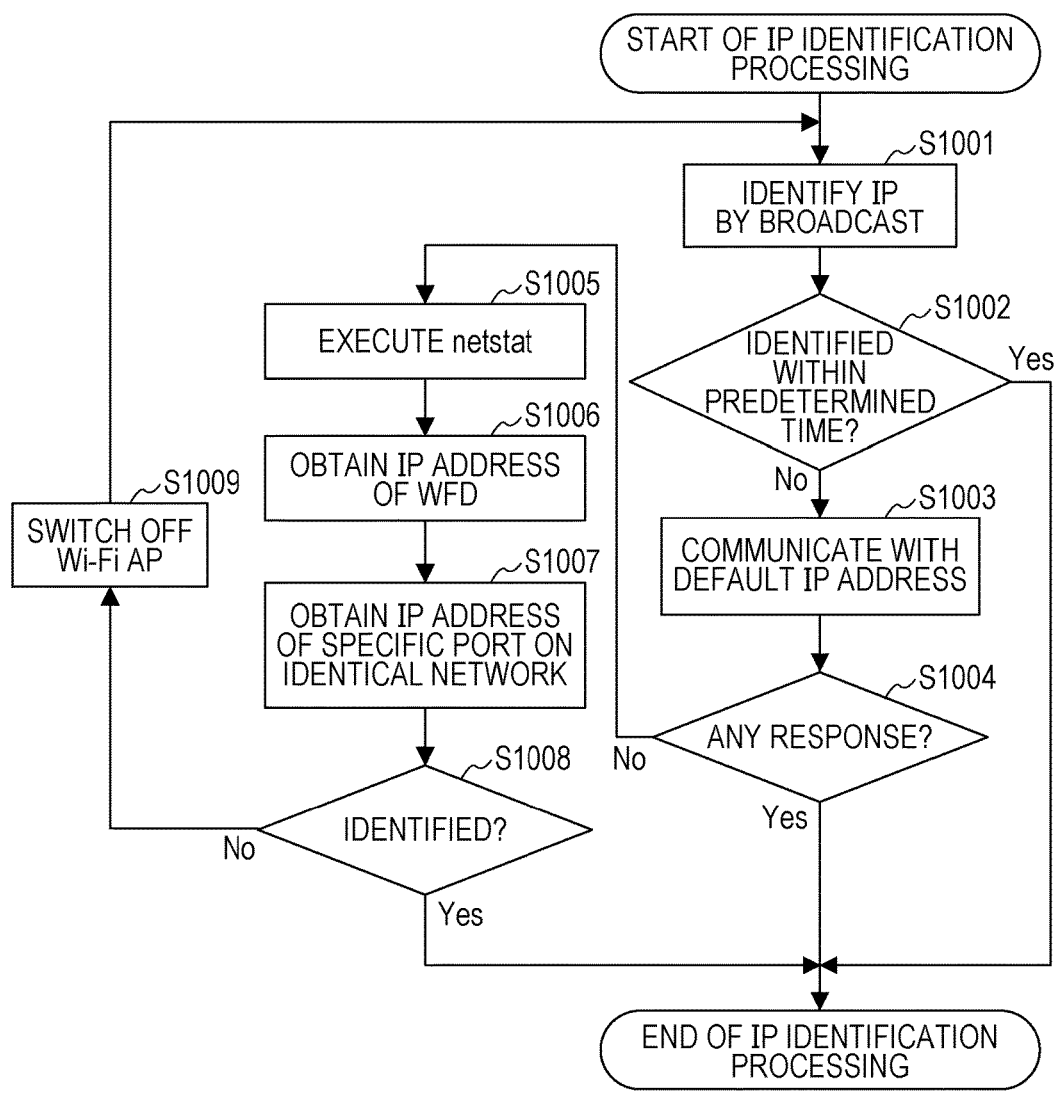
FIG. 10 is a flowchart illustrating processing for searching a printer according to Embodiment 3.

FIG. 10 is a flowchart illustrating IP address identifying processing for a WFD connection according to the present embodiment. Because the processing in S1001 to S1007 is the same as the processing in S801 to S807 as described above, any repetitive descriptions will be omitted.

Obtaining an IP address from network information can be prevented based on settings by a smartphone vendor or an IT administrator. Therefore, after the processing in S1007, it is determined whether an IP address has been identified (S1008). If an IP address is identified, the IP address identifying processing ends. If an IP address is not identified in S1008, the Wi-Fi® AP is switched off (resulting in a disconnected state) (S1009). When Wi-Fi® and WFD are both applied, a communication is not stable when a response from the printer 102 to the broadcast executed in S1001 is obtained. When the Wi-Fi® AP is switched off the communication is temporarily switched to a communication only by WFD so that stabilized communication can be achieved. If the Wi-Fi® AP is switched off in S1009, a response to the broadcast packet transmitted in S1001 can be received during a predetermined time period in S1002. Therefore, an IP address can be identified from the response packet. When the Wi-Fi® AP is switched off, a network communication via an AP cannot be performed using a user's Wi-Fi®. Therefore, immediately after the IP address identifying processing ends, the Wi-Fi® AP may be switched on again to establish the Wi-Fi connection again.

Through the processing above, for searching a printer to be performed by the information processing apparatus when a WFD connection is established between the information processing apparatus and the printer, a broadcast packet is transmitted to the printer, and an IP address of the printer is identified from the response thereto. If no response to the broadcast packet is received from the printer, a communication check is performed on the default IP address of the WFD connection to identify the IP address of the printer. If no response to the communication check is received from the printer, a status of the network is obtained, an IP address of the printer is identified from the network part of the IP address for WFD connection of information processing terminal and information regarding a port number to be used for a WFD connection. If an IP address is identified from a status of the network, the Wi-Fi® AP is temporarily switched off. Thus, the simultaneous connection of WFD and Wi-Fi® AP resulting in a failure of obtaining a response to a broadcast is temporarily cancelled, and an IP address can be identified based on the broadcast. Through the processing as described above, a communication with the printer and printing can be performed in a WFD environment.

According to the present disclosure, even when a response to broadcasting is not obtained from an image forming apparatus, an address of the image forming apparatus can be identified using another measure so that print data can be transmitted.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-158783 filed Aug. 21, 2017, which is hereby incorporated by reference herein in its entirety.

What is claimed is:

1. An information processing apparatus, comprising:
   a connection unit configured to connect to an image forming apparatus over a wireless network;
   a first identifying unit configured to broadcast a packet to the wireless network and identify a current address of the image forming apparatus from a response packet to the packet;
   a second identifying unit configured to unicast a packet to a default address of the image forming apparatus on the wireless network and, if a response packet to the packet is received, to identify that the current address of the image forming apparatus is the default address;
   a third identifying unit configured to, if the first identifying unit and the second identifying unit do not identify the current address of the image forming apparatus, obtain an address of the information processing apparatus in the wireless network and information regarding a connection state of the network of the information processing apparatus and identify the current address of the image forming apparatus based on the address of the information processing apparatus and the information regarding the connection state of the network of the information processing apparatus; and
   a transmitting unit configured to transmit print data to the identified current address of the image forming apparatus.

2. The information processing apparatus according to claim 1, wherein the information regarding the connection state of the network of the information processing apparatus includes an address of the information processing apparatus and an address of a communication partner in the wireless network.

3. The information processing apparatus according to claim 2, wherein the third identifying unit obtains an address of the information processing apparatus and an address of a specific port in an identical network to that of the information processing apparatus based on the information regarding the connection state of the network of the information processing apparatus so that the current address of the image forming apparatus can be identified.

4. The information processing apparatus according to claim 3, wherein the third identifying unit calculates a network part of the address of the information processing apparatus and determines whether the address of the image forming apparatus and the network part of the address of the information processing apparatus match to determine whether the image forming apparatus and the information processing apparatus are in the identical network.

5. The information processing apparatus according to claim 1, further comprising:
   a determining unit configured to determine whether an owner functioning as an access point of the wireless network is the image forming apparatus; and
   a fourth identifying unit configured to identify a current address of the image forming apparatus by obtaining an address of the owner if the determining unit determines that the owner functioning as an access point of the wireless network is the image forming apparatus.

6. The information processing apparatus according to claim 1, further comprising:
   a determining unit configured to determine whether the third identifying unit identifies the current address of the image forming apparatus,
   wherein if the determining unit determines that the third identifying unit does not identify the current address of the image forming apparatus, the first identifying unit disconnects the connection and broadcasts the packet to the wireless network and the current address of the image forming apparatus is identified from the response packet to the packet.

7. A control method for an information processing apparatus, the method comprising:
   connecting to an image forming apparatus over a wireless network;
   broadcasting a packet to the wireless network;
   identifying a current address of the image forming apparatus from a response packet to the packet;
   unicasting a packet to a default address of the image forming apparatus on the wireless network, wherein, if a response packet to the packet is received, identifying that the current address of the image forming apparatus is the default address;
   obtaining, if the current address of the image forming apparatus is not identified and the default address is not identified as the current address of the image forming apparatus, an address of the information processing apparatus in the wireless network and information regarding a connection state of the network of the information processing apparatus and identifying the current address of the image forming apparatus based on the address of the information processing apparatus and the information regarding the connection state of the network of the information processing apparatus; and
   transmitting print data to the identified current address of the image forming apparatus.

8. The control method according to claim 7, wherein the information regarding the connection state of the network of the information processing apparatus includes an address of the information processing apparatus and an address of a communication partner in the wireless network.

9. The control method according to claim 8, wherein identifying the current address includes obtaining an address of the information processing apparatus and an address of a specific port in an identical network to that of the information processing apparatus based on the information regarding the connection state of the network of the information processing apparatus so that the current address of the image forming apparatus can be identified.

10. The control method according to claim 9, wherein identifying the current address includes calculating a network part of the address of the information processing apparatus and determining whether the address of the image forming apparatus and the network part of the address of the information processing apparatus match to determine whether the image forming apparatus and the information processing apparatus are in the identical network.

11. The control method according to claim 7, further comprising:
   determining whether an owner functioning as an access point of the wireless network is the image forming apparatus; and
   identifying a current address of the image forming apparatus by obtaining an address of the owner if it is determined that the owner functioning as an access point of the wireless network is the image forming apparatus.

12. The control method according to claim 7, further comprising:
   determining whether the current address of the image forming apparatus is identified,
   wherein if it is determined that the current address of the image forming apparatus is not identified, the connection is disconnected and the packet is broadcast to the wireless network and the current address of the image forming apparatus is identified from the response packet to the packet.

13. A non-transitory recording medium storing instructions to be executed in a computer, the instructions causing the computer to: connect to an image forming apparatus over a wireless network;
broadcast a packet to the wireless network;
identify a current address of the image forming apparatus from a response packet to the packet;
unicast a packet to a default address of the image forming apparatus on the wireless network wherein, if a response packet to the packet is received, identify that the current address of the image forming apparatus is the default address;
obtain, if the current address is not identified and the default address is not identified as the current address of the image forming apparatus, an address of the information processing apparatus in the wireless network and information regarding a connection state of the network of the information processing apparatus and identify the current address of the image forming apparatus based on the address of the information processing apparatus and the information regarding the connection state of the network of the information processing apparatus; and
transmit print data to the identified current address of the image forming apparatus.

* * * * *